(12) United States Patent
Allen, Jr. et al.

(10) Patent No.: US 8,070,943 B2
(45) Date of Patent: Dec. 6, 2011

(54) PUMP SYSTEM FOR DEEP FRYERS USING TRANS-FAT-FREE COOKING OIL

(75) Inventors: William E. Allen, Jr., Cedar Falls, IA (US); John T. Stillman, Cedar Falls, IA (US)

(73) Assignee: Viking Pump, Inc., Cedar Falls, IA (US)

( * ) Notice: Subject to any disclaimer, the term of this patent is extended or adjusted under 35 U.S.C. 154(b) by 435 days.

(21) Appl. No.: 12/469,220

(22) Filed: May 20, 2009

(65) Prior Publication Data
US 2010/0000923 A1    Jan. 7, 2010

Related U.S. Application Data

(60) Provisional application No. 61/077,726, filed on Jul. 2, 2008.

(51) Int. Cl.
*A47J 37/12* (2006.01)
(52) U.S. Cl. .................................. 210/167.28
(58) Field of Classification Search ............. 210/167.28, 210/DIG. 9
See application file for complete search history.

(56) References Cited

U.S. PATENT DOCUMENTS 4,561,807 A * 12/1985 Hilse et al. ...................... 406/99
5,776,530 A * 7/1998 Davis et al. ................... 426/233

* cited by examiner

*Primary Examiner* — Chester Barry
(74) *Attorney, Agent, or Firm* — Miller, Matthias & Hull LLP (57) ABSTRACT

A pump for use in a filtration process for a deep fryer is disclosed. The pump includes a drive shaft linked to a motor or motor drive shaft. The drive shaft passes through a seal assembly before passing into the pump chamber. The seal includes an outer seal housing that accommodates a lip seal. The lip seal is fabricated from PTFE. A combination oil filtration and supply system for a deep fryer is also disclosed that includes a motor linked to the drive shaft. The drive shaft passes through a supply pump and a filter/return pump. The supply pump includes an inlet in communication with a fresh oil reservoir and an outlet in communication with the filter/return pump. The filter/return pump includes an inlet in each communication with an oil filtration system and an outlet in communication with the outlet of the supply pump and an inlet to an oil distribution network. The oil distribution network includes a plurality of outlets, each in communication with an inlet of a vat. Each vat each includes an outlet in communication with the oil filtration system. The supply pump further includes a bypass valve that closes the inlet to the supply pump when flow from the fresh oil reservoir is cut off by closing a fresh oil supply valve. The bypass valve permits continuous circulation of fresh oil in the supply pump chamber and around the seal to prolong the life of the seal.

19 Claims, 9 Drawing Sheets

PUMP SYSTEM FOR DEEP FRYERS USING TRANS-FAT-FREE COOKING OIL

BACKGROUND

1. Technical Field

This disclosure relates to pumps for cooking oil and, more specifically, pumps for delivering unsaturated and/or non-trans-fat cooking oils. Still more specifically, this disclosure relates to improved pump and seal mechanisms for pumps intended to deliver cooking oils. The disclosed seal mechanisms and pump designs provide improved wear characteristics and therefore require less maintenance and longer operating times between servicing and replacements than existing seal mechanisms. Further, this disclosure relates to pumps and distribution systems for filtering and recirculating oil and for adding fresh oil to deep oil fryers using a single motor.

2. Description of the Related Art

Trans-fat is the common name for a type of unsaturated fat with trans-isomer fatty acid(s). Trans-fats may be monounsaturated or polyunsaturated. Most trans-fats consumed today are created industrially through partial hydrogenation of plant oils through a process developed in the early 1900s. The goal of partial hydrogenation is to add hydrogen atoms to unsaturated fats, making them more saturated, i.e. fewer double bonds between carbon atoms. These more saturated fats have a higher melting point, which makes them attractive for baking and extends their shelf-life. For example, the hydrogenated vegetable oil or trans-fat added to shelf-stable peanut butter that replaces natural peanut oil enables such shelf-stable peanut butters to be stored without refrigeration and without the trans-fat separating from the other components of the peanut butter. In contrast, natural peanut butters have shorter shelf lives and the peanut oil naturally separates from the heavier components of peanut butter.

Unlike other dietary fats, trans-fats are neither essential nor even nutritious. In fact, the consumption of trans-fats increases the risk of coronary heart disease by raising levels of "bad" LDL cholesterol and lowering levels of "good" HDL cholesterol. Health authorities worldwide recommend that consumption of trans-fat be reduced to trace amounts. In sum, trans-fats from partially hydrogenated oils are widely regarded as being less healthy than naturally occurring oils.

Chemically, trans-fats are made of the same building blocks as non-trans-fats, but have a different arrangement. In trans-fatty acid molecules, the hydrogen atoms bonded to pairs of double-bonded carbon atoms (characteristic of all unsaturated fats) are in the trans rather than the cis molecular arrangement. This results in a straight, rather than kinked, shape for the carbon chain, more like the straight chain of a fully saturated fat. The trans and cis versions of a fatty acid having the same chemical formula have different chemical and physical properties owing to the slightly different bond configuration. Notably, the trans-fat has a much higher melting point, due to the ability of the trans molecules to pack more tightly, forming a solid that is more difficult to break apart and that it is a solid at human body temperatures.

Prior to 2006, Americans consumers could not determine the quantity of trans-fats in food products. This information could only be inferred from the ingredient list, notably from the partially hydrogenated ingredients. According to the FDA, the average American consumes 5.8 grams of trans-fat per day or about 2.6% of an average caloric intake. On Jul. 11, 2003, the FDA issued a regulation requiring manufacturers to list the trans-fat content on food labels. However, unlike many other countries, trans-fat levels of less than 0.5 grams per serving can be listed as 0 grams trans-fat on the food label. Though this is a small amount, multiple servings can exceed recommended levels. Thus, many consumers do not know how to interpret the meaning of trans-fat content on the nutrition facts panel. In fact, without specific prior knowledge about trans-fat and its negative health effects, consumers, including those at risk for heart disease, may misinterpret nutrient information provided on the panel. However, there is no requirement to list trans-fats on institutional food packaging, thus bulk purchasers like schools, hospitals, and cafeterias are unable to evaluate the trans-fat content of commercial food items.

The FDA defines trans-fats as containing one or more trans linkage that are not in a conjugated system. This is an important distinction, as it distinguishes non-conjugated synthetic trans-fats from naturally occurring fatty acids with conjugated trans double bonds, such as conjugated linoleic acid.

Critics of the FDA have expressed concern that the 0.5 gram per serving threshold is too high to refer to a food as free of trans-fat and that consumers should be warned about the presence of naturally occurring trans-fats in processed foods. Some US cities are independently acting to reduce consumption of trans-fats with public education campaigns and requests to restaurant owners to voluntarily eliminate trans-fat from their offerings.

Therefore, pressure from consumers and public health advocates to convert from cooking oils containing trans-fats to cooking oils free of trans-fats is present now and will only increase in the future. It is anticipated that corn, soybean and canola oils will be the primary substitutes for trans-fat oils.

Deep fryers are a necessity of the food service industry and particularly for the fast food service industry. Deep fryers use a substantial amount of shortening or oil during the cooking process. During the cooking process much of the oil is absorbed by a food product, resulting in loss of oil volume. The remaining oil can become filled with debris due to constant use. Accordingly, as more expensive oils that are free of trans-fats are being used, there is a need to extend the usable life of the unabsorbed oil and to keep the unused oil clean during the cooking process. Accordingly, there is a need for a deep fryer that efficiently filters used oil.

Further, with respect to hot oil or "deep" fryers, improved pump designs are needed as manufactures replace trans-fat oils with zero trans-fat oils. More specifically, a typical deep fryer requires at least two pumps: first, a filter/return pump for drawing used cooking oil from the cooking vat through a filter system and then pumping the filtered oil back into the cooking vat; and second, a supply pump for "topping-off" the cooking vat with clean or fresh oil as the oil level in the vat decreases. However, many deep fryers include multiple cooking vats. As a result, the distribution system to direct the flow from the filter/return and supply pumps to the various cooking vats of a typical deep fryer is complex and cumbersome.

Further, currently available pumps, used for use in food manufacturing and in food preparation, are prone to frequent seal failure when used to pump natural, unsaturated and trans-fat-free oils such as corn, soybean and canola oils. For example, pumps are used in hot oil filtration process of deep fryers used in the manufacturing or preparation of French fries, fish, and chicken. During the transition between trans-fat oils and zero trans-fat oils, it has been found that seal failure has become commonplace. Accordingly, an improved seal design for pumps intended for pumping a hot trans-fat-free oils is needed and a seal design that particularly avoids the use of the currently employed material—fluoropolymer elastomers or fluoroelastomers.

Fluoroelastomers are commonly used in O-rings and other molded or extruded goods. Fluoroelastomers are part of a family comprising copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) containing specialties. The fluorine content of the most common fluoroelastomers varies between 66 and 70%. As noted above, the failure rate of fluoroelastomer seals in pumps used to pump zero trans-fat oils is unacceptably high.

The fluoroelastomer lip seals are failing in a timeframe as little as six months when used with zero trans-fat oils. The failure is due to tearing of the fluoroelastomer material as the oil "varnishes" out onto the shaft thereby causing the seal to stick and then abrade away in a short period of time. Therefore, new pumps and new seals for use in pumps are needed for reliably pumping zero trans-fat oils.

SUMMARY OF THE DISCLOSURE

Improved pumps used in the hot oil filtration and supply process of deep fryers are disclosed.

One disclosed pump combines the functions of the filter/return pump and supply pump described above into a single structure that can distribute filtered oil and fresh oil to a plurality of cooking vats. This disclosed pump design eliminates the need for separate filter/return and supply pumps and separate motors. The pumping functions, filter/return and supply, are performed separately or non-contemporaneously even though a single motor and common drive shaft are employed. Specifically, the pump includes separate supply and filter/return chambers and separate supply and a filter/return rotors and an integral by-pass valve that allows the supply pump rotor to pump fresh oil in a continuous loop (e.g., a holding pattern or loop) when the filter/return rotor is pumping filtered oil back to the vats.

In another refinement, the disclosed pump maintains circulating oil in the pump chamber that is in communication with the pump shaft seal thereby prolonging the shaft seal life and reducing maintenance costs.

In another refinement, disclosed pump includes a distribution block or manifold to simplify the oil distribution network of a multiple-vat deep fryer.

In another refinement, the disclosed pumps are constructed with polytetrafluoroethylene (PTFE) lip seals to seal around the drive shaft of the pump. It is been surprisingly found that the use of PTFE material minimizes sticking and abrading identified as the failure mode of the current fluoroelastomer material.

In a refinement, the improved PTFE lip seals include two or three lips. In another refinement, the improved PTFE lip seals comprise an improved c-shaped seal housing made from inner and outer L-shaped housing members. In a further refinement, the seal housing or seal casing is manufactured from stainless steel.

In a refinement, a disclosed combination oil filtration and supply system for a deep fryer includes a motor linked to a drive shaft. The drive shaft passes through a supply pump and a filter/return pump. The supply pump includes an inlet in communication with a fresh oil reservoir and an outlet in communication with the filter/return pump. The filter/return pump includes an inlet in communication with an oil filtration system and an outlet in communication with the outlet of the supply pump and an inlet to an oil distribution network. The oil distribution network includes at least one outlet in communication with an inlet of at least one vat. The vat includes an outlet in communication with the oil filtration system. The supply pump includes a bypass valve that closes the inlet to the supply pump when flow from the fresh oil reservoir stops.

In a refinement, a fresh oil control valve is disposed between the fresh oil reservoir and the inlet to the supply pump. As a result, when the fresh oil control valve is closed, the bypass valve of the supply pump closes the inlet to the supply pump and oil within the supply pump circulates within a supply pump chamber disposed within the supply pump as the filter/return pump circulates oil through the filtration system.

In a refinement, the drive shaft passes through both the supply pump chamber and the filter/return pump chamber. A supply driven rotor is mounted on the drive shaft in the supply pump chamber and a filter/return driven rotor is mounted on the drive shaft in the filter/return pump chamber.

In another refinement, the drive shaft passes through a PTFE seal assembly described above accommodated within the supply pump casing and opposite the supply driven rotor from the filter/return pump casing. The seal assembly is continuously exposed to the circulating fresh oil both when the bypass valve of the supply pump is closed and when the supply pump is delivering fresh oil to the vats.

In a refinement, the filter/return driven rotor is longer than the supply driven rotor and therefore the filter/return pump has a higher capacity than the supply pump.

In a refinement, the oil distribution network includes a distribution block having an inlet in communication with the outlet of the filter/return pump and at least one outlet in communication with the inlet of the at least one vat. The distribution block may include a lateral passageway connecting the single inlet to a plurality of outlets, each of which are connected to a separate vat.

A refinement, each vat has its own outlet connected to its own outlet control valve that is in communication with the filtration system. Each vat also has its own inlet connected to its own inlet control valve that is in communication with the oil distribution network. A fresh oil supply control valve is disposed between the fresh oil reservoir and the inlet to the supply pump. The system being able to be manipulated into a filter/recirculation mode and a fill mode while the motor and drive shaft continually run.

In the filter/recirculation mode, the fresh oil supply control valve is closed and the bypass valve in the supply pump has closed the inlet to the supply pump. The outlet control valves and the inlet control valves of the vats are open thereby causing oil to circulate from the vats, through the filtration system, through the filter/return pump, through the oil distribution network and back to the vats.

In the fill or "top off" mode, the outlet control valves of the vats are closed, the inlet control valves of the vats are open, and the fresh oil supply valve is open. As a result, oil flows from the fresh oil reservoir, through the supply pump, through the filter/return pump, through the distribution network, through the inlet control valves of the vats and into the vats.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
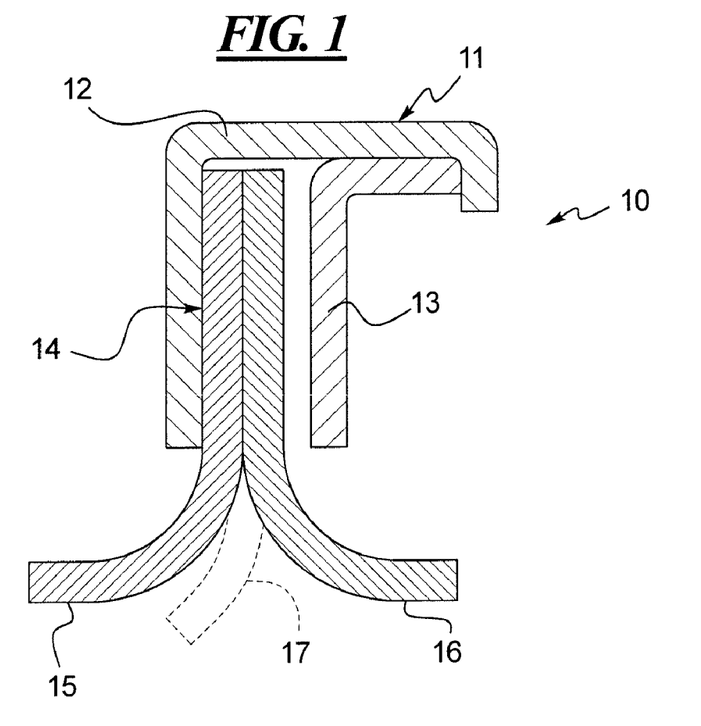
FIG. 1 is a sectional view of an improved lip seal and lip seal case made in accordance with this disclosure.

FIG. 1 illustrates an improved seal assembly 10 that includes a housing 11 that comprises an outer case member 12 and an inner case member 13. Sandwiched between the inner and outer housing members 12, 13 is a seal member 14, which is preferably a lip seal as shown in FIG. 1. The lip seal 14 is preferably fabricated from poly(tetrafluoroethene) or poly(tetrafluoroethylene) (PTFE).

Water and water-containing substances like most foods do not wet PTFE, therefore adhesion to PTFE surfaces is inhibited. Due to this property PTFE is used as a non-stick coating for pans and other cookware. PTFE is very non-reactive, and so is often used in containers and pipe work for reactive and corrosive chemicals. Where used as a lubricant, PTFE reduces friction, wear and energy consumption of machinery. However, PTFE has not been heretofore used extensively as a seal in pumps and not used as seals for pumps such as filtration pumps for deep fryers that utilize zero trans-fat oils.

The seal member 14 may comprise one, two or three lip members as shown at 15, 16 and 17 in FIG. 1. The third lip member 17 or the middle lip member 17, shown phantom in FIG. 1, if utilized, preferably falls to one side or towards one of the outer lip members 15, 16. Alternatively, the middle lip member 17, if utilized, may be more robust than the outer lip members 15, 16 and may maintain a neutral position between the outer lip members 15, 16.

Figure 2:
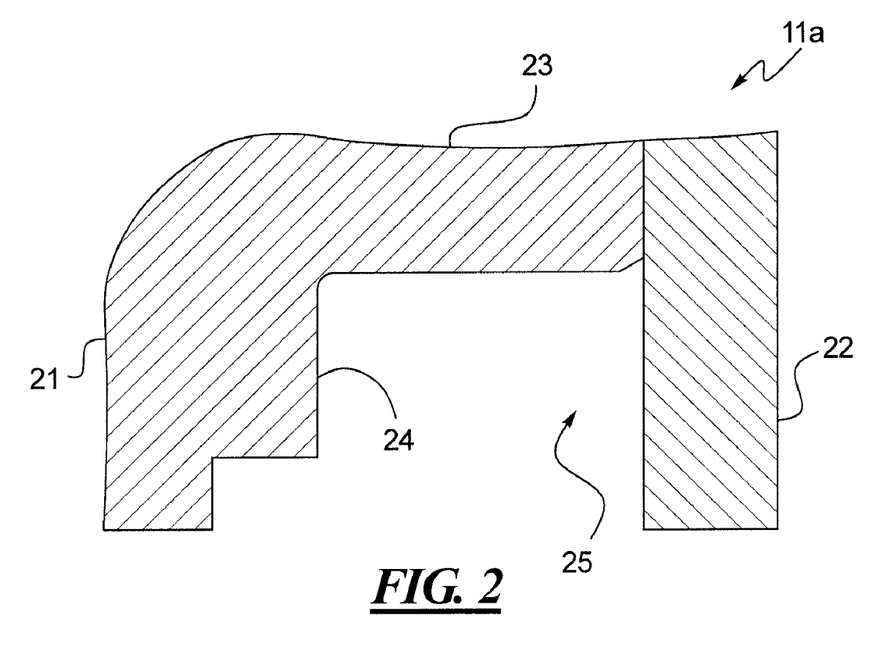
FIG. 2 is a sectional view of an alternative case for the lip seal shown in FIG. 1.

The inner and outer case members 12, 13 as shown in FIG. 1 are primarily L-shaped. In contrast, the casing 11a of FIG. 2 includes a sturdier, more robust design with inner and outer leg members 21, 22 disposed on either side of a top panel 23. A reinforcing inner leg member 24 is also shown that helps define a middle cavity 25 for receiving and holding a seal member 14 (not shown in FIG. 2). In contrast, the housing 11 as shown in FIG. 1 is slimmer and more compact and is therefore the currently preferred embodiment.

Figure 3:
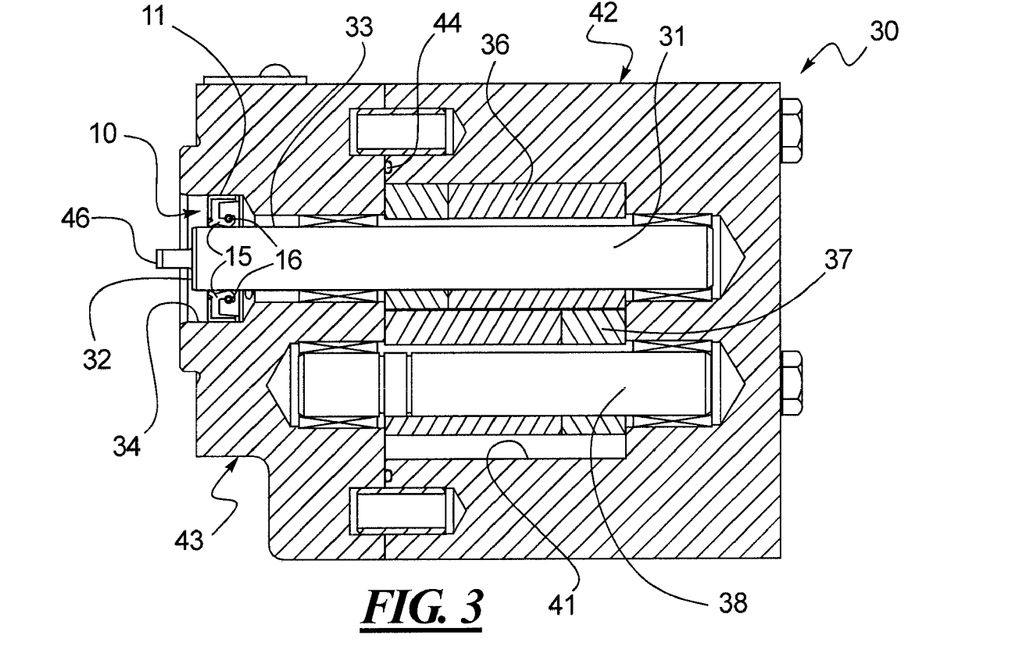
FIG. 3 is a sectional view taken substantially along line 3-3 of FIG. 6 illustrating a pump incorporating the lip seal and lip seal case shown in FIG. 1 and that is intended to be used in a filtration system for a deep fryer that employs little or no trans-fat cooking oil.
Figure 4:
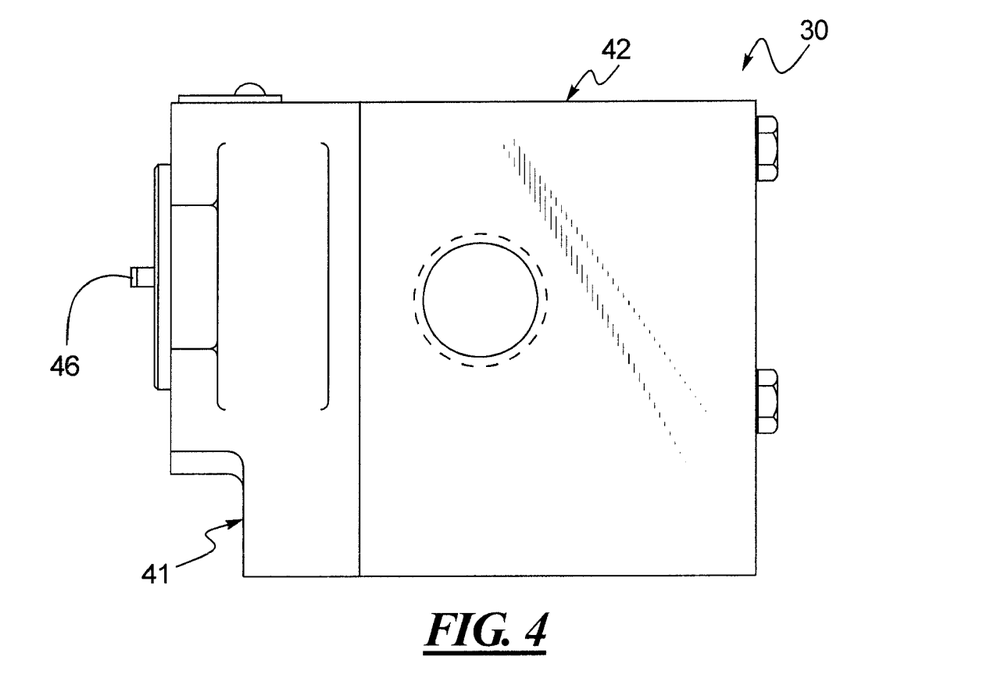
FIG. 4 is a side plan view of the pump shown in FIG. 3.
Figure 5:
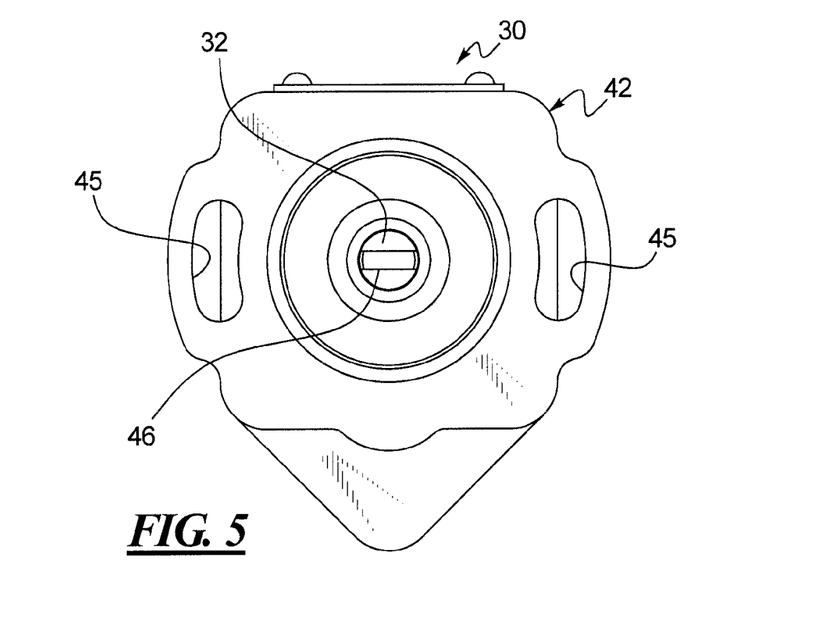
FIG. 5 is a front plan view of the pump shown in FIGS. 3-4.
Figure 6:
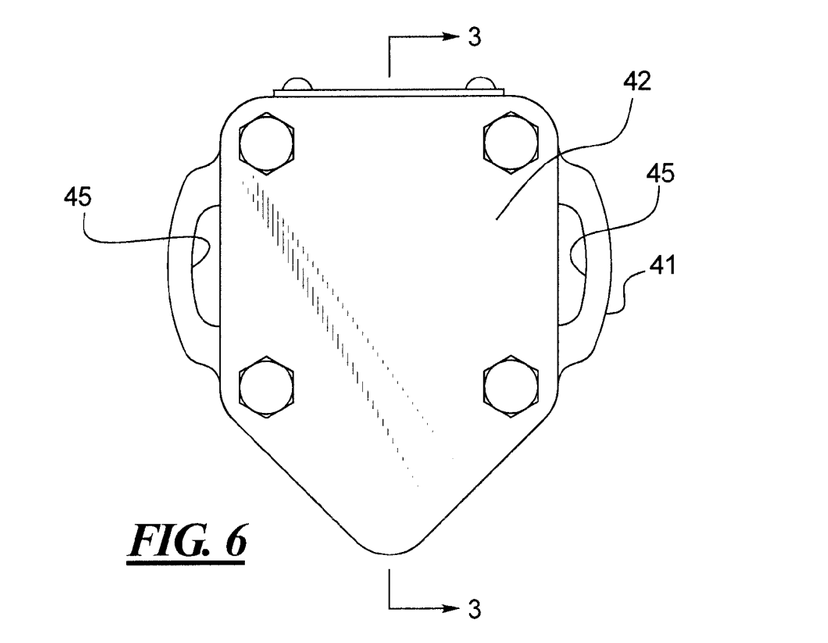
FIG. 6 is a rear plan view of the pump shown in FIGS. 3-6.

FIG. 3 illustrates a pump 30 that includes a drive shaft 31 linked to a motor (not shown) at its inboard end 32. The drive or input shaft 31 passes through the seal assembly 10. As shown in FIG. 3, lip members 15, 16 engage an outer surface 33 of the drive shaft 31 and the housing 11 holds the seal assembly 10 in place within the cavity 34 in the front casing 43. The drive or input shaft 31 passes through a drive gear 36 that is enmeshed with an output or driven gear 37 through which an output or driven shaft 38 passes. The pump chamber 41 is disposed within the rear casing 42 which is sealably connected to the front casing 43. The seal 44 prevents fluid from leaking outward from the pump chamber 41 and through the front casing 43. As shown in FIGS. 5-6, the front casing 43 includes a pair of handles shown at 45. A drive shaft or motor coupling is shown at 46.

Figure 7:
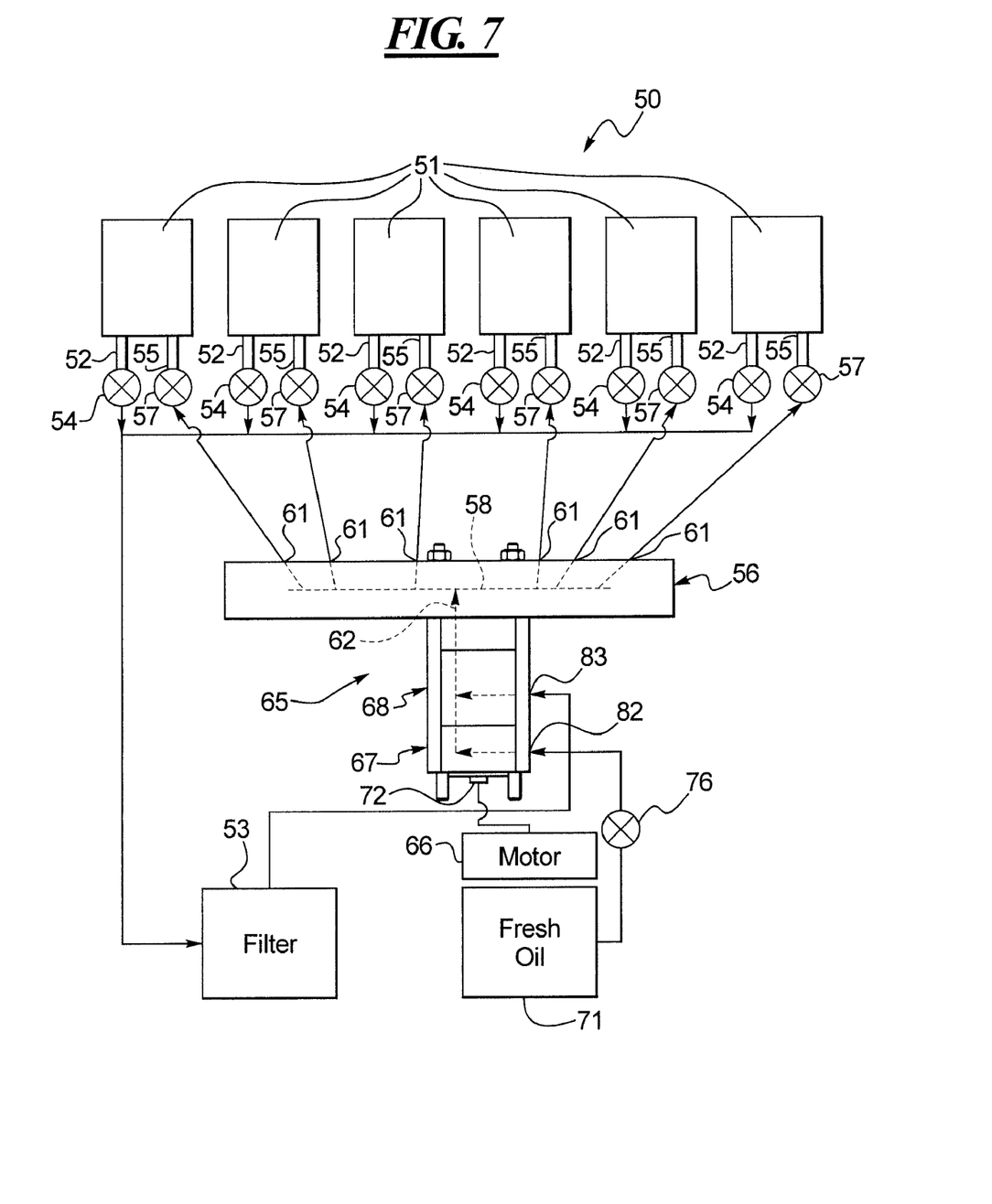
FIG. 7 is a schematic illustration of a multi-vat deep fryer equipped with a filter system, a fresh oil reservoir and a disclosed dual filter/return and supply pump system and oil distribution block or manifold.

The seal assembly 10 illustrated in FIGS. 1-6 can be employed in the improved pump system illustrated in FIGS. 7-17. FIG. 7 illustrates a multi-vat deep fryer system 50 with, in this case, six cooking vats 51. Each vat 51 is equipped with outlets 52 that are in communication with a filter system 53 and which may include outlet control valves 54 between the vats 51 and the filter system 53. Each vat 51 also includes an inlet 55 in communication with the distribution block 56. Inlet control valves 57 may be disposed between the vats 51 and the distribution block 56. As illustrated in greater detail below, the distribution block 56 includes a common lateral passageway shown schematically at 58 in FIG. 7 and, in the example shown in FIG. 7, the distribution block 56 includes six outlet ports 61 although distribution blocks 56 can vary in size and complexity and the number of outlet ports can range from less than six to greater than ten. The distribution block 56 includes a single inlet shown schematically at 62.

The distribution block 56 forms part of a pump assembly 65 but is clearly an optional component, especially in the case of a single vat 51 deep fryer or a deep fryer with only a few vats 51. The pump assembly 65 may be driven by a single motor shown schematically at 66. As shown in FIG. 7, the motor 66 drives both a supply pump 67 and a filter/return pump 68. The supply pump 67 is in communication with a fresh oil reservoir 71 and is used to fill or "top off" the vats 51 as the cooking oil is consumed or becomes depleted. In contrast, the filter/return pump 68 is in communication with the filter system 53 which, in turn, is in communication with the vat outlets 52. The filter system can comprise a conventional basket or screen-type filter or also include a filter pad or mesh as illustrated in WO 2009/014562. Various hot oil filters and filtration systems are known to those skilled in the art.

The motor 66 rotates a drive shaft 72 that drives both the supply pump 67 and filter/return pump 68. Thus, in the embodiment illustrated in FIG. 7, the supply pump 67 and filter/return pump 68 operate contemporaneously as explained below. The control of flow of the fresh oil from the reservoir 71 is provided by the valve 76. It will be noted that all of the valves 54, 57, 76 and the motor 66 may be controlled by a central controller and/or timers (not shown) and additional fluid level sensors may be associated with each vat 51 as well as the filter system 53 and fresh oil reservoir 71. In short, automation of the system 50 illustrated in FIG. 7 can be achieved by one skilled in the art with relative ease.

Figure 8:
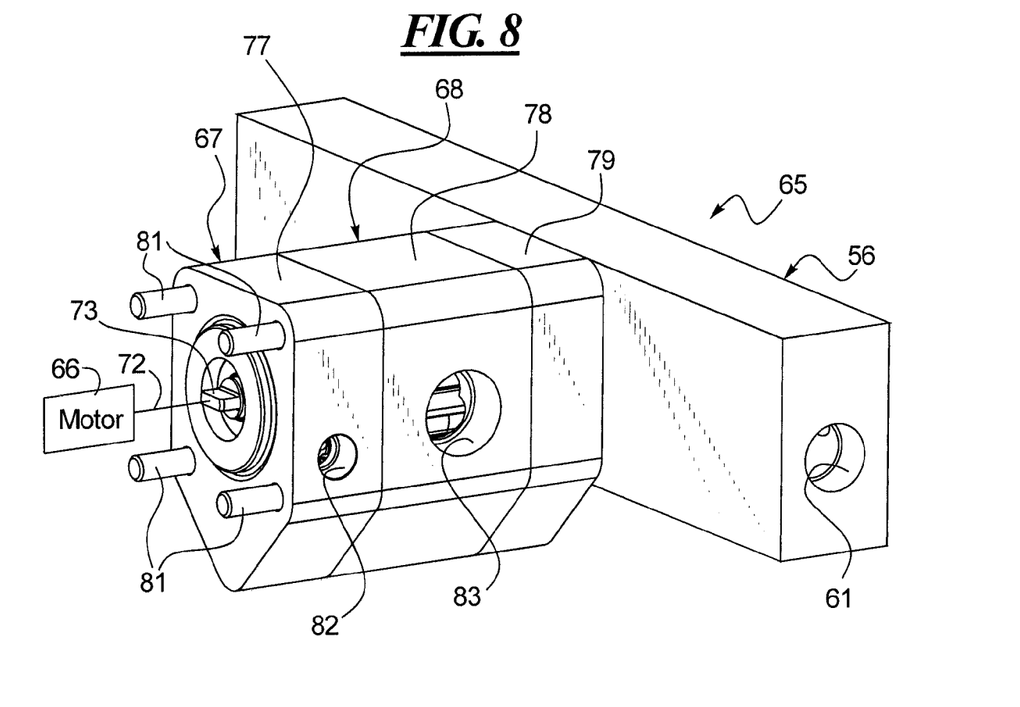
FIG. 8 is a left side perspective view of a disclosed pump assembly including a supply pump, filter/return pump, head and distribution manifold.
Figure 9:
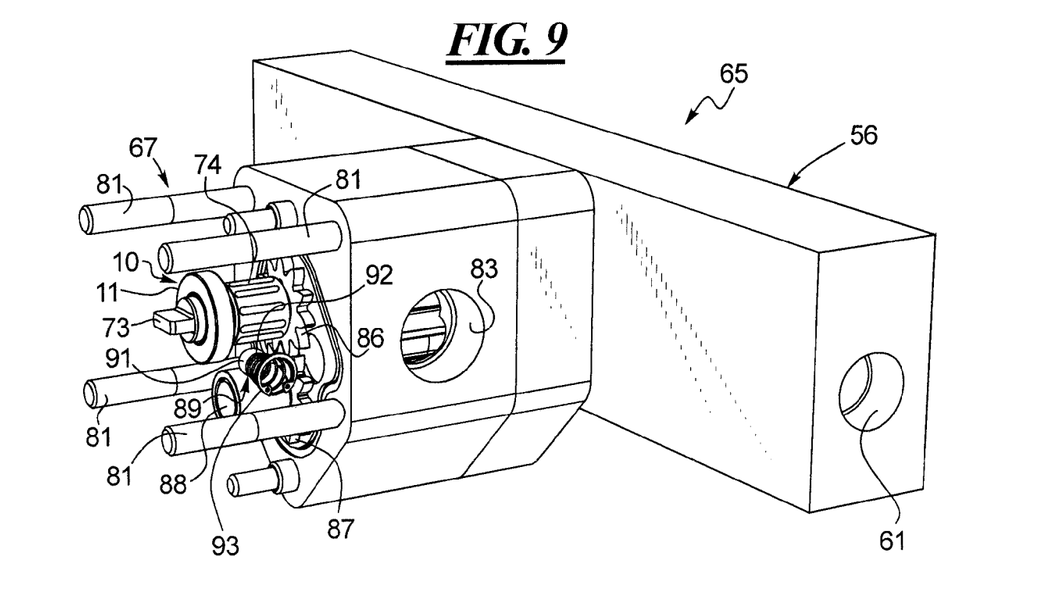
FIG. 9 another left side perspective view of the pump assembly shown in FIG. 8 with the casing for the supply pump removed.
Figure 10:
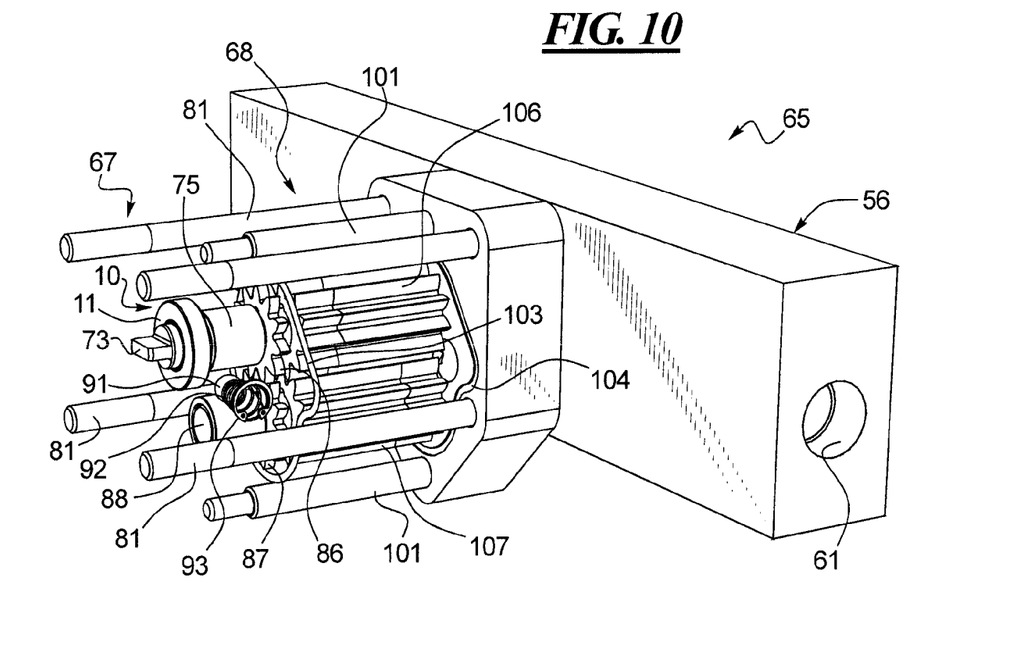
FIG. 10 is another left side perspective view of the pump assembly shown in FIGS. 8-9 with the casings for the supply and filter/return pumps removed.
Figure 11:
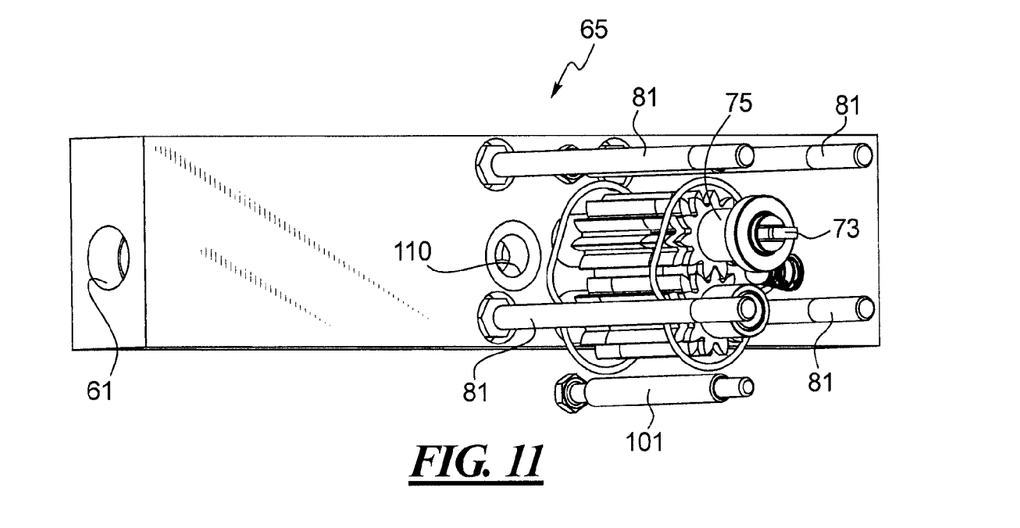
FIG. 11 is a right side perspective view of the pump assembly shown in FIGS. 8-10 with the casings for the supply pump, filter/return pump and head removed.

The pump assembly 65 is illustrated in greater detail in FIGS. 8-11. Referring first to FIG. 8, the motor 66 rotates the motor drive shaft 72 which is coupled to an inboard end 73 of the pump drive shaft 74 (see FIG. 9). The drive shaft 74 may be a solid structure, or the shaft 74 may be covered by a shell or cage 75 as illustrated in FIGS. 10-11. The cage 75 abuts the housing 11 seal assembly 10 illustrated in FIGS. 1-3. Returning to FIG. 8, the pump assembly 65 includes two pumps: a supply pump 67 with a supply pump casing 77; and the filter/return pump 68 with a filter/return casing 78. In the embodiment illustrated in FIG. 8, a head casing is shown at 79. The casings 77, 78, 79 may be separate components or may be a unitary structure that is milled or molded from a suitable material capable of withstanding the temperatures associated with deep fryers. The casings 77, 78, 79 are connected to the distribution block 56 by a plurality of bolts or fasteners 81, which may also be used to mount the motor 66 in back of the supply pump 67.

The supply pump 67 includes an inlet 82 with an outlet or discharge passageway 70, 80 (not shown in FIG. 8; see FIGS. 15-16) being provided in the casing 78 of the filter/return pump 68 and in the head casing 79 respectively as explained below. The filter/return pump 68 includes an inlet 83 and may also include an outlet 83*a* (FIG. 15) disposed on the opposite side of the casings 78 in the event a distribution block 56 is not employed. If an outlet opening 83*a* is provided opposite the inlet 83 in the casing 78 and the distribution block 56 is employed, such an opening 83*a* can be simply plugged or sealed. The distribution block 56 shown in FIGS. 8-13 includes ten discharge ports, only one of which is shown at 61 in FIG. 8.

Turning to FIG. 9, the casing 77 of the supply pump 67 has been removed to expose the drive gear 86 that is mounted to or connected to the drive shaft 74 as well as the driven gear 87 that is mounted to or connected to the driven shaft 88. A case 75 or seal assembly 10 is not required for the driven gear 88 as it is enclosed by the supply pump casing 77.

Figure 14:
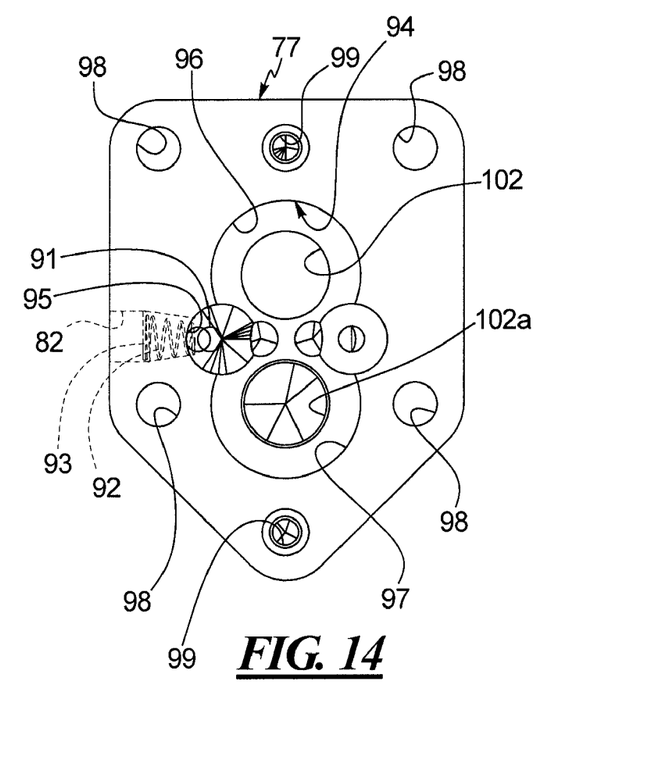
FIG. 14 is a front plan view of the supply pump casing.

A bypass valve assembly 89 is illustrated in FIG. 9 which includes a ball 91, a spring 92, and the retaining ring 93. The bypass valve assembly 89 is disposed inside the inlet 82 of the supply pump casing 77. Referring to FIGS. 7, 9 and 14, after the vats 51 have been topped off or filled with fresh oil, the fresh oil control valve 76 is closed. However, the motor 66 and the drive shaft 72 continue to run and therefore the supply pump 67 and filter/return pump 68 continue to run for recirculation and filtering purposes. With no fluid pressure at the supply pump inlet 82 due to the closure of the valve 76, back pressure builds within the supply pump chamber 94 pressing the ball 91 against the bias of the spring 92 and against the ball seat 95. Thus, with the fresh oil control valve 76 closed, the fresh oil that is loaded in the chamber 94 continues to circulate as the supply pump rotors 86, 87 rotate. This continuous circulation of fresh oil in the supply pump chamber 94 without displacing any fresh oil towards the vats 51 provides continuous lubrication to the seal assembly 10 and the seals 15-17 (see FIG. 1) thereby making the seal assembly 10 long-lasting and reliable. As shown in FIG. 14, the supply pump inlet 82 is machined to support the retaining ring 93 and the inlet 82 is tapered as it extends towards the seat 95 to accommodate the tapered spring 92. Still referring to FIG. 14, the drive rotor 86 is disposed in the upper chamber 96 and the driven rotor 87 is disposed in the lower chamber 97. The holes 98 accommodate the bolts or fasteners 81 that secure the casings 77, 78, 79 to the distribution block 56. The holes 99 receives additional fasteners 101 (see FIGS. 9-11) that is used to secure the casings 77, 78, 79 together. The openings 102, 102*a* accommodate the drive and driven shafts 74, 88 respectively.

Figure 15:
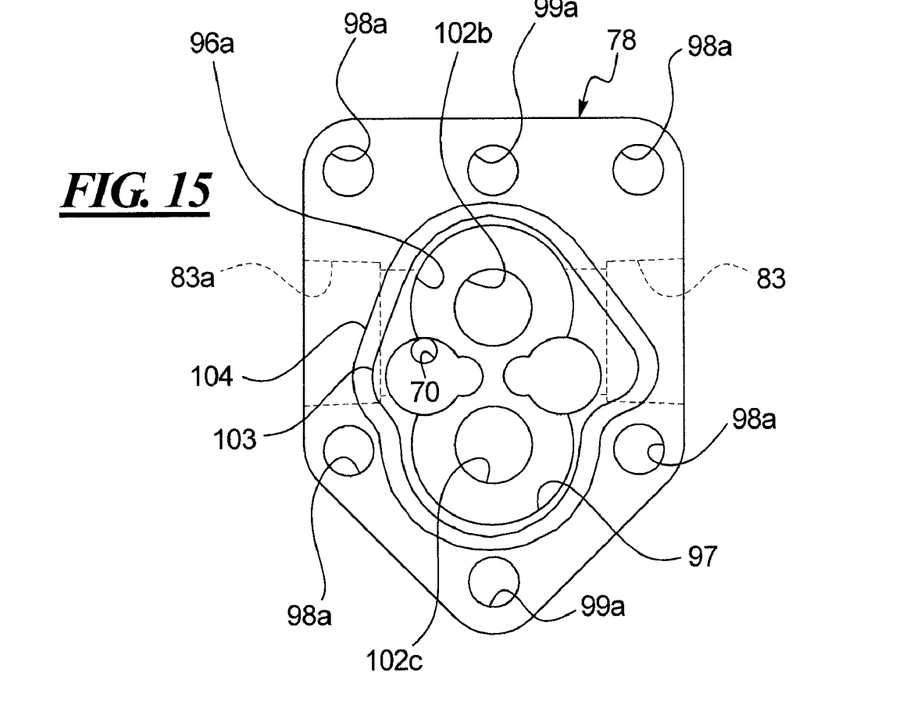
FIG. 15 is a rear plan view of the filter/return casing.

FIG. 10 illustrates the filter/return pump 68 in greater detail including the gaskets 103, 104 disposed between disposed between the casings 77, 78 and 78, 79 respectively. FIG. 10 also illustrates the filter/return drive rotor 106 and driven rotor 107. The rotors 106, 107 are mounted, connected or coupled to the drive and driven shafts 74, 88 respectively, like the drive and driven rotors 86, 87 of the supply pump 67. As shown in FIG. 15, the filter/return casing 78 may include an inlet 83 and an opposing outlet 83*a* that may be plugged or sealed if the distribution block 56 is employed. In the event a distribution block 56 is provided, the head casing 79 shown in FIGS. 16-17 includes an outlet 80 that is in communication with the inlet 110 and lateral passageway 58 of the distribution block 56 (see FIGS. 11-12).

Returning to FIGS. 15, the holes 98*a* accommodate the fasteners 81 and the holes 99*a* accommodate the fasteners 101. The openings 102*b*, 102*c* accommodate the drive and driven shafts 72, 88 respectively. The upper pump chamber 96*a* accommodates the drive rotor 106 and the lower pump chamber 97*a* accommodates the driven rotor 107.

Figure 12:
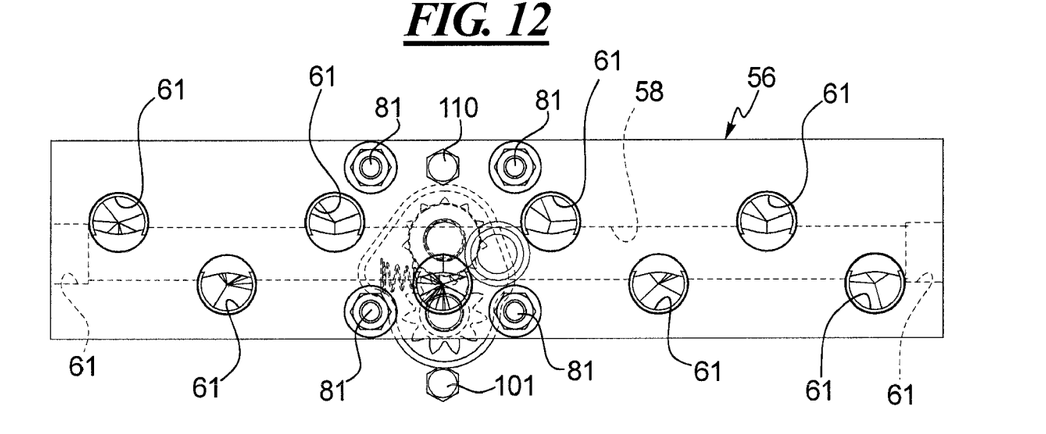
FIG. 12 is a front view of the manifold illustrating the ten outlets and single inlet.
Figure 13:
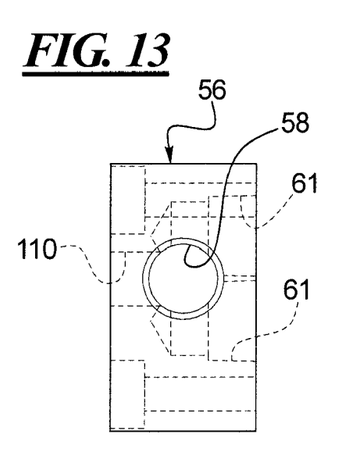
FIG. 13 is a left end of view of the distribution block.
Figure 16:
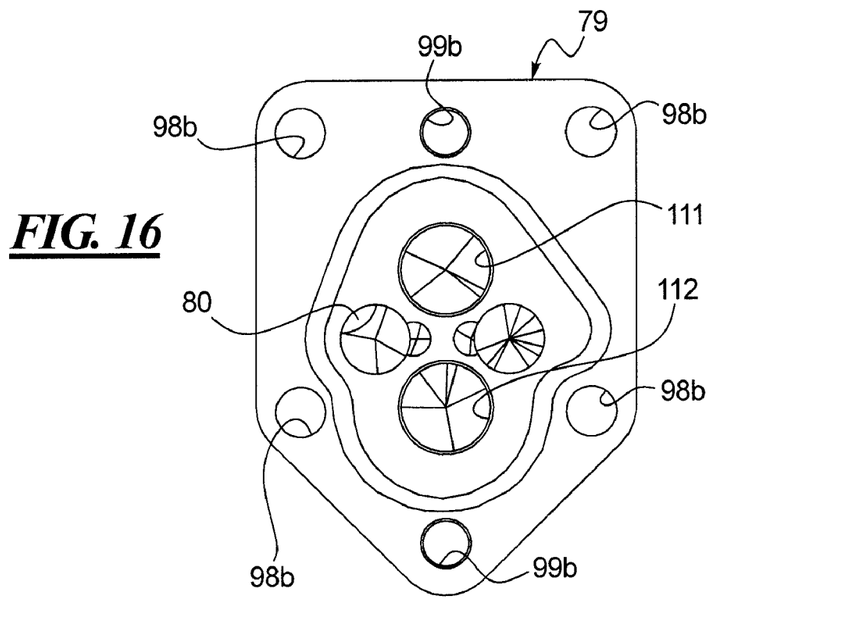
FIG. 16 is a rear plan view of the head casing.
Figure 17:
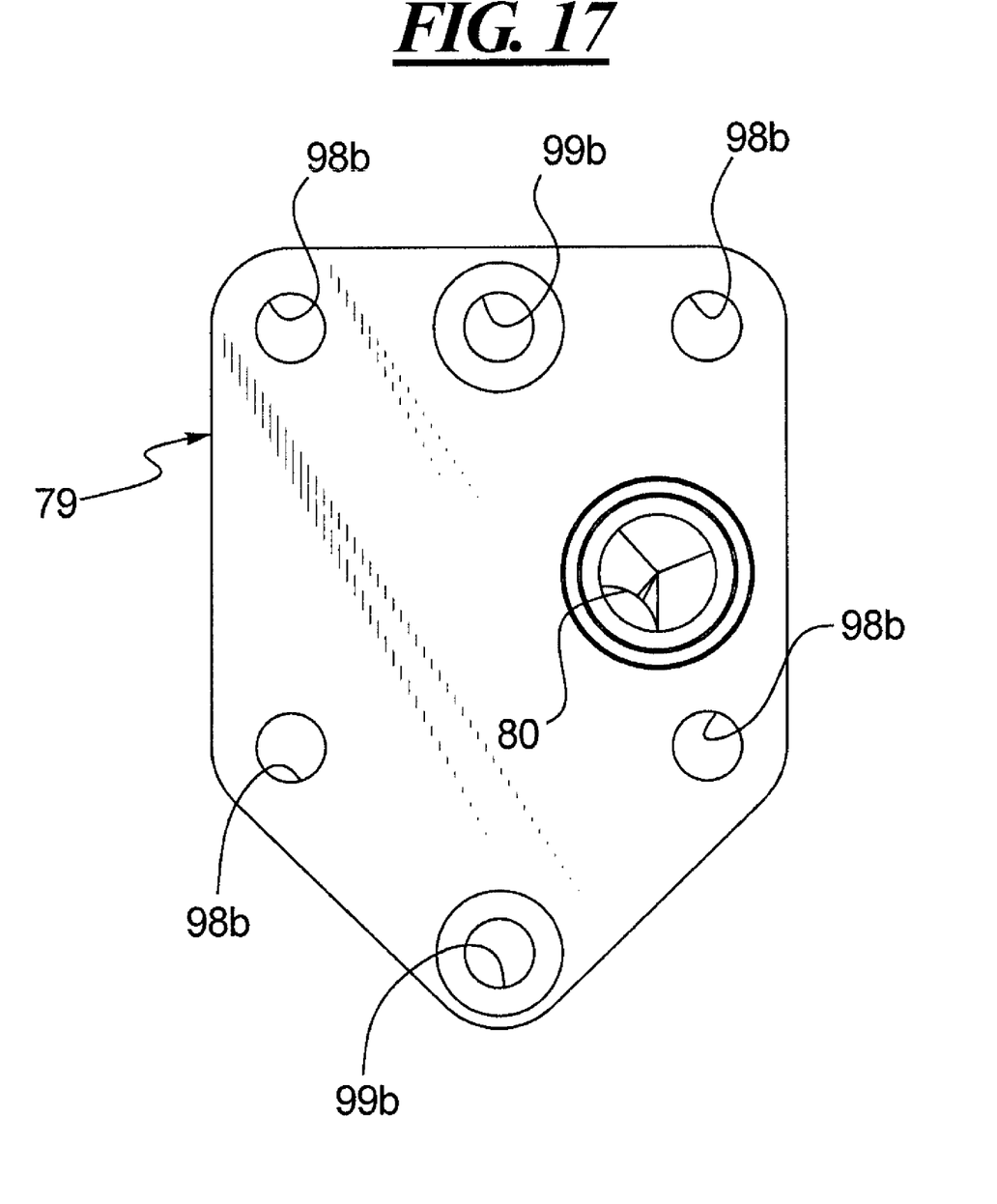
FIG. 17 is a front plan view of the head casing, illustrating the outlet port that connects to the distribution block.

Turning to FIGS. 16-17, which illustrate the head casing 79, a distal end of the drive shaft 72 is received in the recess 111 and the distal end of the driven shaft is received in the recess 112. The holes 98*b*, 99*b* accommodate the fasteners 81, 101 respectively. The opening 80 in the head casing 79 provides communication to the inlet 110 of the distribution block (see FIGS. 11-13) which, in turn, is in communication with the lateral passageway 58 which, in turn, is in communication with the ten outlets shown at 61 (FIG. 12).

In operation, the motor 66 is operated continuously in a filter/return mode with the outlet and inlet valves 54, 57 open as oil proceeds from a vat 51, through its outlet 52 and outlet valve 54, through the filter system 53, through the filter/return pump 68, through the distribution block 56, and through the inlet valve 57 and inlet 55 back to the vat 51. The vats 51 may be topped off by opening the fresh oil control valve 76, leaving the inlet valves 57 of the vats 51 open and closing the outlet valves 54 of the vats 51. Fresh oil will flow from the reservoir 71, through the valve 76, through the supply pump 67, through the distribution block 56, through the inlets 55 to the vats 51. Flow from the filter system 53 has stopped due to closure of the outlet valves 54 during the topping off procedure. Once a sufficient oil level has been reached, which may be determined visually or using a sensor or float indicator, the fresh oil supply valve 76 is closed and the outlet valves 54 of the vats 51 are opened so a continuous or recycle can be carried out as oil flows from the vats 51, through the outlets and valves 52, 54, through the filter system 53, through the filter/return pump 68, through the distribution block 56, through the inlet valves and inlets 57, 55 back to the vats 51.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A combination oil filtration and supply system for a deep fryer, the combination comprising:
   a motor linked to a drive shaft, the drive shaft passing through a supply pump and a filter/return pump, the supply pump comprising an inlet in communication with a fresh oil reservoir and an outlet in communication with the filter/return pump, the filter/return pump comprising an inlet in communication with an oil filtration system and an outlet in communication with the outlet of the supply pump and an inlet to an oil distribution network, the oil distribution network comprising at least one outlet in communication with an inlet of at least one vat, the vat further comprising an outlet in communication with the oil filtration system, the supply pump further comprising a bypass valve that closes the inlet to the supply pump when flow from the fresh oil reservoir stops.

2. The system of claim 1 further comprising a fresh oil control valve is disposed between the fresh oil reservoir and the inlet to the supply pump, wherein when the fresh oil control valve is closed, the bypass valve of the supply pump closes the inlet to the supply pump and oil within the supply pump circulates within a supply pump chamber disposed within the supply pump.

3. The system of claim 1 further comprising a supply pump casing defining a supply pump chamber and a filter/return casing defining a filter/return pump chamber, the drive shaft passing through both the supply pump chamber and the filter/return pump chamber, the system further comprising a supply driven rotor mounted on the drive shaft in the supply pump chamber and a filter/return driven rotor mounted on the drive shaft in the filter/return pump chamber.

4. The system of claim 3 wherein the drive shaft further passing through a seal assembly accommodated within the supply pump casing and opposite the supply driven rotor from the filter/return pump casing, the seal assembly being exposed to the circulating oil when the bypass valve of the supply pump is closed.

5. The system of claim 4 wherein the seal assembly comprising an annular seal case and a resilient annular lip seal member, the lip seal member sealably engaging the drive shaft, and the seal member comprising PTFE.

6. The system of claim 3 wherein the filter/return driven rotor having an axial length greater than an axial length of the supply driven rotor.

7. The system of claim 1 wherein the oil distribution network comprises a distribution block having an inlet in communication with the outlet of the filter/return pump and at least one outlet in communication with the inlet of the at least one vat.

8. The system of claim 1 further comprising a plurality of vats, each vat having its own inlet in communication with the oil distribution network and its own outlet in communication with the oil filtration system, the oil distribution network comprising a distribution block having an inlet in communication with the outlet of the filter/return pump and a plurality of outlets, each outlet of the distribution block being in communication with one of the inlets of the vats.

9. The system of claim 1 wherein the outlet of the at least one vat is connected to an outlet control valve that is in communication with the filtration system, the inlet of the at least one vat is connected to an inlet control valve that is in communication with the oil distribution network, a fresh oil supply control valve is disposed between the fresh oil reservoir and the inlet to the supply pump, the system being able to be manipulated into a filter/recirculation mode and a fill mode while the motor and drive shaft continually run, in the filter/recirculation mode, the fresh oil supply control valve is closed and the bypass valve in the supply pump has closed the inlet to the supply pump, the outlet control valve and the inlet control valve of the at least one vat are open thereby causing oil to circulate from the at least one vat, through the filtration system, through the filter/return pump, through the oil distribution network and back to the at least one vat, in the fill mode, the outlet control valve of the at least one vat is closed, the inlet control valve of the at least one vat is open, and the fresh oil supply valve is open thereby causing oil to flow from the fresh oil reservoir, through the supply pump, through the filter/return pump, through the distribution network, through the inlet control valve of the at least one vat and into the at least one vat.

10. The system of claim 1 further comprising a plurality of vats, each vat having its own outlet connected to its own outlet control valve that is in communication with the filtration system, each vat having its own inlet connected to its own inlet control valve that is in communication with the oil distribution network, a fresh oil supply control valve being disposed between the fresh oil reservoir and the inlet to the supply pump, the system being able to be manipulated into a filter/recirculation mode and a fill mode while the motor and drive shaft continually run, in the filter/recirculation mode, the fresh oil supply control valve is closed and the bypass valve in the supply pump has closed the inlet to the supply pump, the outlet control valves and the inlet control valves of the vats are open thereby causing oil to circulate from the vats, through the filtration system, through the filter/return pump, through the oil distribution network and back to the vats, in the fill mode, the outlet control valves of the vats are closed, the inlet control valves of the vats are open, and the fresh oil supply valve is open thereby causing oil to flow from the fresh oil reservoir, through the supply pump, through the filter/return pump, through the distribution network, through the inlet control valves of the vats and into the vats.

11. A pump system for use in a filtration process of a deep fryer, the pump comprising: a casing; a drive shaft passing through the casing and through a seal assembly; the seal assembly comprising an annular seal casing and a resilient annular lip seal member; the lip seal member sealably engaging the drive shaft; and the seal member comprising PTFE, a motor linked to the drive shaft, the casing comprises a supply pump casing and a filter/return pump casing, the drive shaft passing through the supply pump and filter/return pump casings, the supply pump casing comprising an inlet in communication with a fresh oil reservoir and an outlet in communication with the filter/return pump casing, the filter/return pump casing comprising an inlet in communication with an oil filtration system and an outlet in communication with the outlet of the supply pump casing and an inlet to an oil distribution network, the oil distribution network comprising at least one outlet in communication with an inlet of at least one vat of a deep fryer, the at least one vat further comprising an outlet in communication with the oil filtration system, the supply pump casing further comprising a bypass valve that closes the inlet to the supply pump when flow from the fresh oil reservoir stops.

12. The system of claim 11 further comprising a fresh oil control valve is disposed between the fresh oil reservoir and the inlet to the supply pump casing, wherein when the fresh oil control valve is closed, the bypass valve of the supply pump casing closes the inlet to the supply pump casing and oil within the supply pump casing circulates within a supply pump chamber disposed within the supply pump casing as the motor and drive shaft continuously run.

13. The system of claim 11 wherein the supply pump casing defines a supply pump chamber and the filter/return casing defines a filter/return pump chamber, the drive shaft passing through both the supply pump chamber and the filter/return pump chamber, the system further comprising a supply driven rotor mounted on the drive shaft in the supply pump chamber and a filter/return driven rotor mounted on the drive shaft in the filter/return pump chamber.

14. The system of claim 12 wherein the seal assembly is continuously exposed to the circulating oil when the bypass valve of the supply pump casing is closed and fresh oil passing through the supply pump casing when the bypass valve is open.

15. The system of claim 13 wherein the filter/return driven rotor having an axial length greater than an axial length of the supply driven rotor.

16. The system of claim 11 wherein the oil distribution network comprises a distribution block having an inlet in communication with the outlet of the filter/return pump casing and at least one outlet in communication with the inlet of the at least one vat.

17. The system of claim 11 further comprising a plurality of vats, each vat having its own inlet in communication with the oil distribution network and its own outlet in communication with the oil filtration system, the oil distribution network comprising a distribution block having an inlet in communication with the outlet of the filter/return pump casing and a plurality of outlets, each outlet of the distribution block being in communication with one of the inlets of the vats.

18. The system of claim 11 wherein the outlet of the at least one vat is connected to an outlet control valve that is in communication with the filtration system, the inlet of the at least one vat is connected to an inlet control valve that is in communication with the oil distribution network,
   a fresh oil supply control valve is disposed between the fresh oil reservoir and the inlet to the supply pump casing,
   the system being able to be manipulated into a filter/recirculation mode and a fill mode while the motor and drive shaft continually run,
   in the filter/recirculation mode, the fresh oil supply control valve is closed and the bypass valve in the supply pump casing has closed the inlet to the supply pump casing, the outlet control valve and the inlet control valve of the at least one vat are open thereby causing oil to circulate from the at least one vat, through the filtration system, through the filter/return pump casing, through the oil distribution network and back to the at least one vat,
   in the fill mode, the outlet control valve of the at least one vat is closed, the inlet control valve of the at least one vat is open, and the fresh oil supply valve is open thereby causing oil to flow from the fresh oil reservoir, through the supply pump casing, through the filter/return pump casing, through the distribution network, through the inlet control valve of the at least one vat and into the at least one vat.

19. The system of claim 11 further comprising a plurality of vats, each vat having its own outlet connected to its own outlet control valve that is in communication with the filtration system, each vat having its own inlet connected to its own inlet control valve that is in communication with the oil distribution network,
   a fresh oil supply control valve being disposed between the fresh oil reservoir and the inlet to the supply pump casing,
   the system being able to be manipulated into a filter/recirculation mode and a fill mode while the motor and drive shaft continually run,
   in the filter/recirculation mode, the fresh oil supply control valve is closed and the bypass valve in the supply pump casing has closed the inlet to the supply pump casing, the outlet control valves and the inlet control valves of the vats are open thereby causing oil to circulate from the vats, through the filtration system, through the filter/return pump casing, through the oil distribution network and back to the vats,
   in the fill mode, the outlet control valves of the vats are closed, the inlet control valves of the vats are open, and the fresh oil supply valve is open thereby causing oil to flow from the fresh oil reservoir, through the supply pump casing, through the filter/return pump casing, through the distribution network, through the inlet control valves of the vats and into the vats.

\* \* \* \* \*